US007607146B1

(12) United States Patent
Black et al.

(10) Patent No.: US 7,607,146 B1
(45) Date of Patent: Oct. 20, 2009

(54) DATA MEDIUM STORAGE SYSTEMS

(76) Inventors: Brett A. Black, 2011 E. Fifth St., #10, Tempe, AZ (US) 85281; Daniel K. Civalier, 2011 E. Fifth St., #10, Tempe, AZ (US) 85281

( * ) Notice: Subject to any disclaimer, the term of this patent is extended or adjusted under 35 U.S.C. 154(b) by 563 days.

(21) Appl. No.: 11/034,910

(22) Filed: Jan. 12, 2005

Related U.S. Application Data

(60) Provisional application No. 60/536,445, filed on Jan. 13, 2004.

(51) Int. Cl.
*G11B 7/24* (2006.01)
(52) U.S. Cl. ...................................... 720/732
(58) Field of Classification Search .............. 720/732; 312/9.48, 9.47; 206/387.1
See application file for complete search history.

(56) References Cited

U.S. PATENT DOCUMENTS 5,788,088 A * 8/1998 Kao .............................. 211/40
6,203,129 B1 * 3/2001 Kupferschmid ............ 312/9.48
6,341,702 B1    1/2002 MacKelvie
6,789,686 B2 * 9/2004 Bennett et al. ................ 211/40

* cited by examiner

*Primary Examiner*—David D Davis
(74) *Attorney, Agent, or Firm*—Stoneman Volk Patent Group; Martin L. Stoneman; Michael D. Volk, Jr.

(57) ABSTRACT

A system providing efficient cataloging and storage of data-storage devices. The system comprises a plurality of removable holders adapted to hold at least one of the data-medium-containing articles. Each holder is adjustably mounted within a support comprising three cylindrically shaped members. While engaged within the support, the holders are free to move independently along the cylindrically shaped members to permit holders to be added or removed from any position within the indexed plurality of stored holders. The system is modular and may be expanded in size and capacity. The system may be integrated within furnishings.

15 Claims, 8 Drawing Sheets

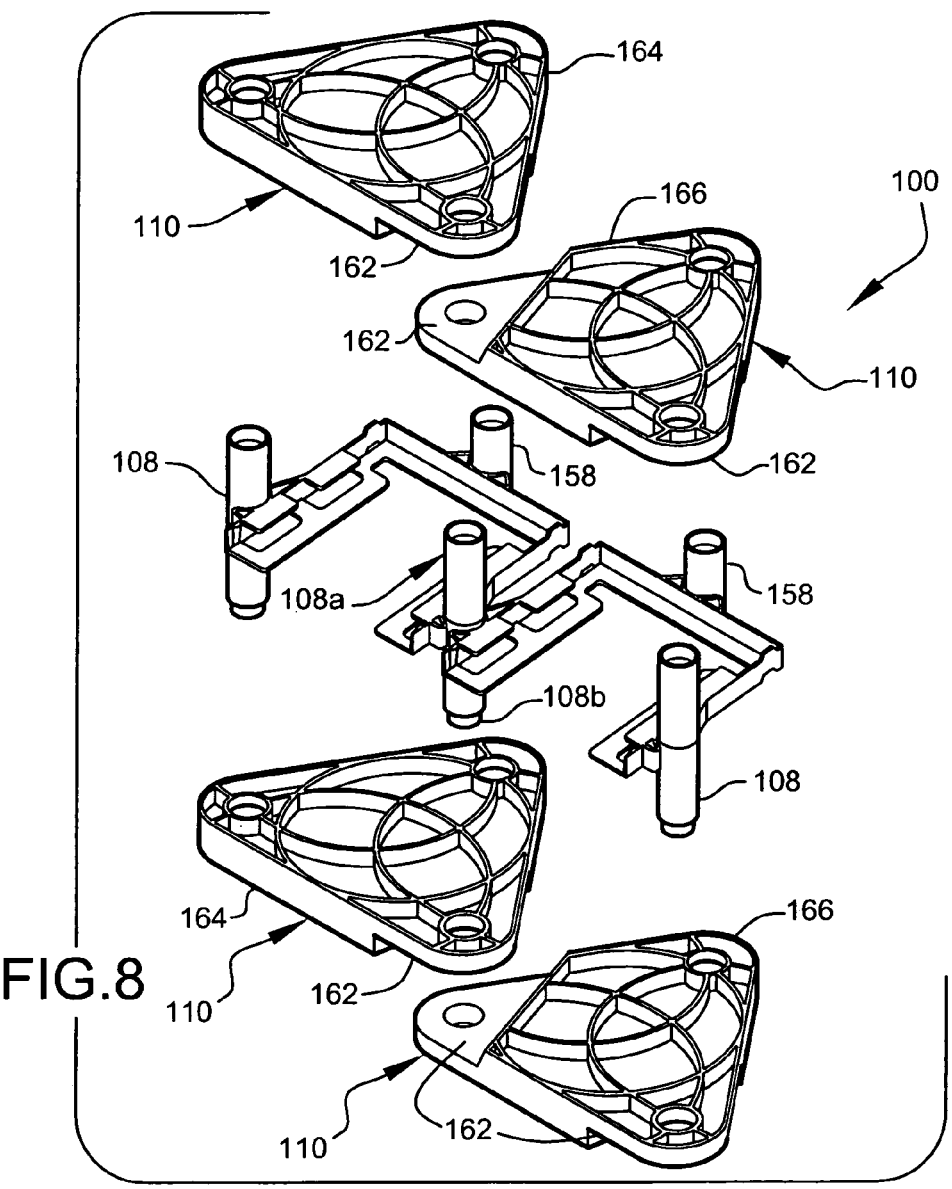
FIG. 8
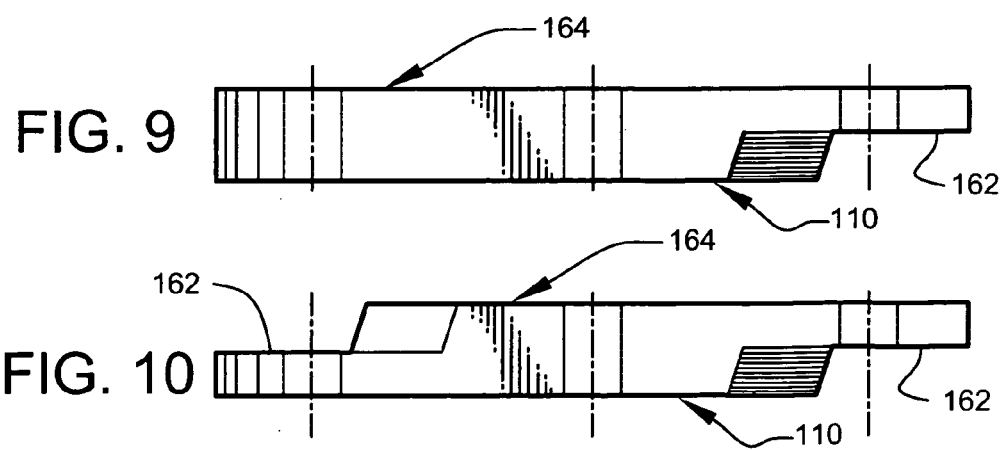
FIG. 9
FIG. 10

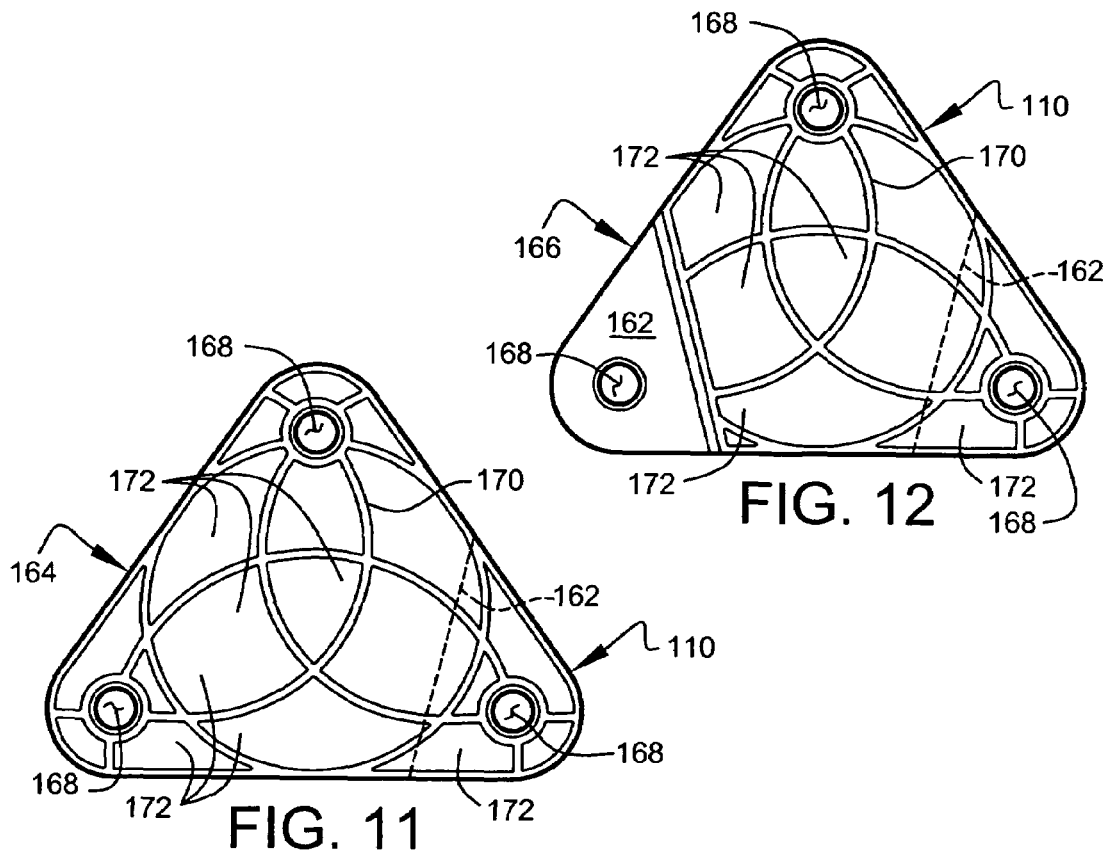
FIG. 11
FIG. 12
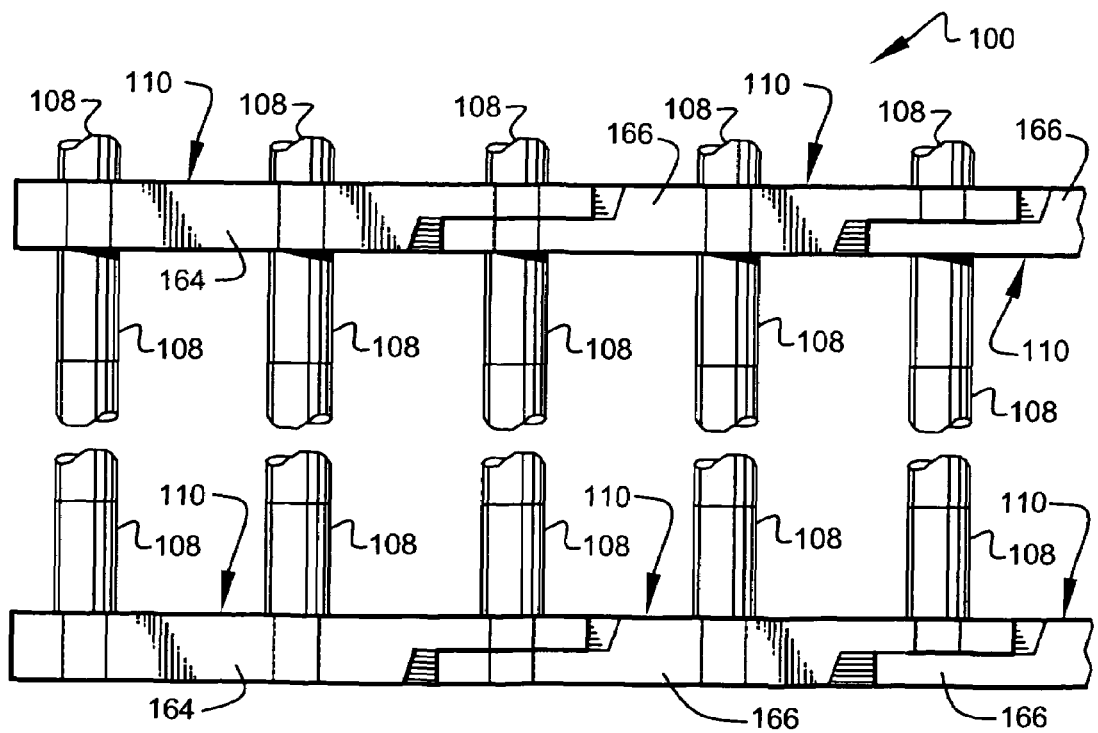
FIG. 13

DATA MEDIUM STORAGE SYSTEMS

CROSS-REFERENCE TO RELATED APPLICATION

The present application is related to and claims priority from prior provisional application Ser. No. 60/536,445, filed Jan. 13, 2004, entitled "DATA MEDIUM STORAGE SYSTEM", the contents of which are incorporated herein by this reference and are not admitted to be prior art with respect to the present invention by the mention in this cross-reference section.

BACKGROUND

This invention relates to providing systems for improved storage of data-medium-containing articles. More specifically, this invention relates to systems providing means for efficient indexing and storage of data-medium-containing articles, such as, for example, compact disk jewel cases.

Technology has revolutionized the ways with which individuals store, transfer and access data. Enormous volumes of digital data now reside in computer storage drives globally, the scope of such data encompassing nearly every area of human endeavor.

It is often necessary to store data in a stable and transferable form apart from the storage drive of a computer. Currently, digital data is most commonly stored on optical storage media such as Compact Disks (CDs) and Digital Versatile Disks (DVDs).

Large collections of data disks are typically stored using one or more systems of hierarchical organization to permit easy access to specific disks from the collection or catalog. As an example, a prolific music collector may possess an organized catalog comprising several hundred music CDs relating to a specific music movement or genre. The collector may have chosen to index the disks alphabetically by artist name, chronologically by year of recording, or by a specific subgenre, for example European vs. American contemporary classical music. As the collector acquires additional disks, the new disks must be inserted into the catalog at the proper position within the pre-established index. In the past, those attempting to modify the index were required to perform the tedious and tiresome process of repositioning existing disks within the storage system each time a new disk was added or removed from the catalog.

OBJECTS AND FEATURES OF THE INVENTION

A primary object and feature of the present invention is to provide a storage system to overcome the above-mentioned problems.

A further object and feature of the present invention is to provide a system for indexing the storage of data containing articles.

It is another object and feature of the present invention to provide such a system that permits at least one index-maintaining quantity-adjustment, allowing the user to adjust quantities within the indexed arrangement of data containing articles without reordering the data containing articles previously stored therein.

It is a further object and feature of the present invention to provide such a system that permits such at least one quantity adjustment, at any user selected position, within the indexed arrangement.

It is another object and feature of the present invention to provide such a system that utilizes an arrangement of data containing article holders, such holders adjustably engaging at least one positioning structure.

It is a further object and feature of the present invention to provide such a system that provides one or more self-guiding features to assist the user in engaging such data containing article holders on such positioning structure.

It is a further object and feature of the present invention to provide such a system that is modular and expandable to provide increased storage capacity.

It is a further object and feature of the present invention to provide such a system that is integrated within furnishings such as cabinets and drawers.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a data medium storage system, relating to storing at least one data-medium-containing article within at least one support supporting at least one indexed arrangement of a plurality of such at least one data-medium-containing articles, such storage system comprising: at least one holder adapted to removably hold the at least one data-medium-containing article; wherein such at least one holder comprises at least one positioner adapted to position such at least one holder to at least one position within the at least one support supporting the at least one indexed arrangement of such plurality of such at least one data-medium-containing articles; at least one self-guider adapted to permit self-guiding of such at least one holder to such to at least one position within the at least one support; wherein such at least one self-guider comprises at least one self-guiding structure adapted to provide at least one geometrical relationship with the support permitting such self-guiding.

Moreover, it provides such a storage system wherein such at least one self-guiding structure permits such at least one holder to be self guided to such at least one position within the at least one support by application of a single line of force at a single point on such at least one holder. Additionally, it provides such a storage system wherein such at least one self-guiding structure comprises at least one ramp-shaped portion. Also, it provides such a storage system wherein: such at least one holder comprises at least one support frame; such at least one support frame comprises at least one side wall and at least one rear wall; and such at least one side wall and such at least one rear wall, in combination, define at least one interior portion adapted to removably contain the at least one data-medium-containing article.

In addition, it provides such a storage system wherein such at least one positioner comprises: at least one lateral engager located adjacent such at least one side wall; and at least one central engager located adjacent such at least one rear wall. And, it provides such a storage system wherein such at least one support frame further comprises at least one hinge adapted to permit at least one user adjustment to at least one outer dimension of such at least one support frame. Further, it provides such a storage system wherein such at least one hinge is integrally formed within such at least one support frame. Even further, it provides such a storage system wherein such at least one holder comprises indicia to assist the user in organizing the at least one indexed arrangement. Moreover, it provides such a storage system wherein such indicia comprises at least one adhesive label. Additionally, it provides such a storage system wherein such at least one holder comprises at least one thermoset resin.

In accordance with another preferred embodiment hereof, this invention provides a data medium storage system, relating to storing at least one data-medium-containing article within at least one support supporting at least one indexed arrangement of a plurality of such at least one data-medium-containing articles, such data medium storage system comprising: at least one such support adapted to support the at least one indexed arrangement of the plurality of the at least one data-medium-containing articles; wherein such at least one such support comprises at least three parallel bars; at least one geometry-fixer adapted to fix at least one geometry among such at least three parallel bars; wherein intersections of such at least three parallel bars with at least one plane perpendicular to such at least three parallel bars form corners of at least one irregular polygon.

Also, it provides such a storage system wherein at least one geometry-fixer comprises at least one portion of at least one furnishing. In addition, it provides such a storage system wherein each such at least three parallel bars comprise at least one substantially cylindrical member having at least one length.

And, it provides such a storage system wherein such at least one substantially cylindrical member comprises at least one length adjuster adapted to adjust such at least one length of such at least one substantially cylindrical member. Further, it provides such a storage system wherein such at least one length adjuster comprises at least one interengaging segment. Even further, it provides such a storage system wherein: such at least one substantially cylindrical member comprises at least one plurality of interengaging segments comprising such at least one interengaging segment. Moreover, it provides such a storage system wherein such at least one interengaging segment comprises at least one interlocker adapted to interlock at least one first such at least one interengaging segment to at least one second such at least one interengaging segment. Additionally, it provides such a storage system wherein such at least one interlocker comprises at least one threaded post and at least one complementary receiving socket. Also, it provides such a storage system wherein such at least one interlocker comprises at least one bayonet post and at least one complementary receiving socket. In addition, it provides such a storage system wherein such at least one interlocker comprises at least one friction-fit post and at least one complementary receiving socket.

In accordance with another preferred embodiment hereof, this invention provides a data medium storage system, relating to storing at least one data-medium-containing article within at least one support supporting at least one indexed arrangement of a plurality of such at least one data-medium-containing articles, such storage system comprising: at least one holder adapted to removably hold the at least one data-medium-containing article; wherein such at least one holder comprises at least one positioner adapted to position such at least one holder to at least one position within the at least one support supporting the at least one indexed arrangement of such plurality of such at least one data-medium-containing articles, at least one self-guider adapted to permit self-guiding of such at least one holder to such to at least one position within the at least one support, wherein such at least one self-guider comprises at least one structure adapted to provide at least one geometrical relationship with the support permitting such self-guiding; at least one such support adapted to support the at least one indexed arrangement of the plurality of the at least one data-medium-containing articles; wherein such at least one support comprises at least three parallel bars, at least one geometry-fixer adapted to fix at least one geometry among such at least three parallel bars, wherein intersections of such at least three parallel bars with at least one plane perpendicular to such at least three parallel bars form corners of at least one irregular polygon.

And, it provides such a storage system wherein such at least one self-guiding structure permits such at least one holder to be self guided to such at least one position within such at least one such support by application of a single line of force at a single point on such at least one holder. Further, it provides such a storage system wherein each such at least one holder, while positioned within such at least one such support, is free to move along at least one path substantially parallel with such at least three parallel bars. Even further, it provides such a storage system wherein such at least one geometry-fixer comprises at least one portion of at least one furnishing.

Moreover, it provides such a storage system wherein: such at least one geometry-fixer comprises at least one first base member; such at least one first base member comprises at least one first side and at least one second side; such at least one first side comprises at least one first aperture; such at least one second side comprises at least one second aperture; and such at least one first aperture and such at least one second aperture are each adapted to receive at least one portion of such at least three parallel bars. Additionally, it provides such a storage system wherein such at least one first base member is adapted to removably couple with at least one second base member. Also, it provides such a storage system wherein such at least one first base member and such at least one second base member, while removably coupled, share at least one bar of such at least three parallel bars.

In addition, it provides such a storage system wherein: such at least one holder comprises at least one support frame; such at least one support frame comprises at least one side wall and at least one rear wall; and such at least one side wall and such at least one rear wall, in combination, define at least one interior portion adapted to removably support the at least one data-medium-containing article. And, it provides such a storage system wherein such at least one positioner comprises: at least one lateral engager located adjacent such at least one side wall; and at least one central engager located adjacent such at least one rear wall. Further, it provides such a storage system wherein, while one such at least one lateral engager is engaged on one first bar of such at least three parallel bars, such at least one holder is movable to engage such at least one central engager on at least one second bar of such at least three parallel bars.

Even further, it provides such a storage system wherein such at least one support frame further comprises at least one hinge adapted to permit at least one user adjustment to at least one outer dimension of such at least one support frame. Furthermore, it provides such a storage system wherein each such at least three parallel bars comprise at least one substantially cylindrical member having at least one outer radius dimension and at least one length.

Even further, it provides such a storage system wherein: such at least one lateral engager and such at least one central engager each comprise at least one interior radius dimension substantially similar to such at least one outer radius dimension of such at least one substantially cylindrical member. Additionally, it provides such a storage system wherein such at least one substantially cylindrical member comprises at least one length adjuster adapted to adjust such at least one length of such at least one substantially cylindrical member. Even further, it provides such a storage system wherein such at least one length adjuster comprises at least one interengaging segment. And, it provides such a system wherein such at least one support frame comprises at least one alignment structure to align at least one first such at least one support frame with at least one second such at least one support frame.

Furthermore, it provides each and every novel feature, element, combination, step and/or method disclosed or suggested by this provisional patent application.

BRIEF DESCRIPTION OF THE DRAWINGS

FIG. 8 shows an exploded perspective view further illustrating the storage system components of a multi-stack configuration according to the preferred embodiment of FIG. 7.

FIG. 9 shows a side view generally illustrating the physical configuration of a typical end base unit according to the preferred embodiments of the present invention.

FIG. 10 shows a side view generally illustrating the physical configuration of a typical intermediate base unit according to the preferred embodiments of the present invention.

FIG. 11 shows a top view generally illustrating the physical configuration of a typical end base unit according to the preferred embodiments of the present invention.

FIG. 12 shows a top view, generally illustrating the physical configuration of a typical intermediate base unit, according to the preferred embodiments of the present invention.

FIG. 13 shows a side view illustrating a typical multi-stack configuration of the storage system according to a preferred embodiment of the present invention.

DETAILED DESCRIPTION OF THE BEST MODES AND PREFERRED EMBODIMENTS OF THE INVENTION

Figure 1:
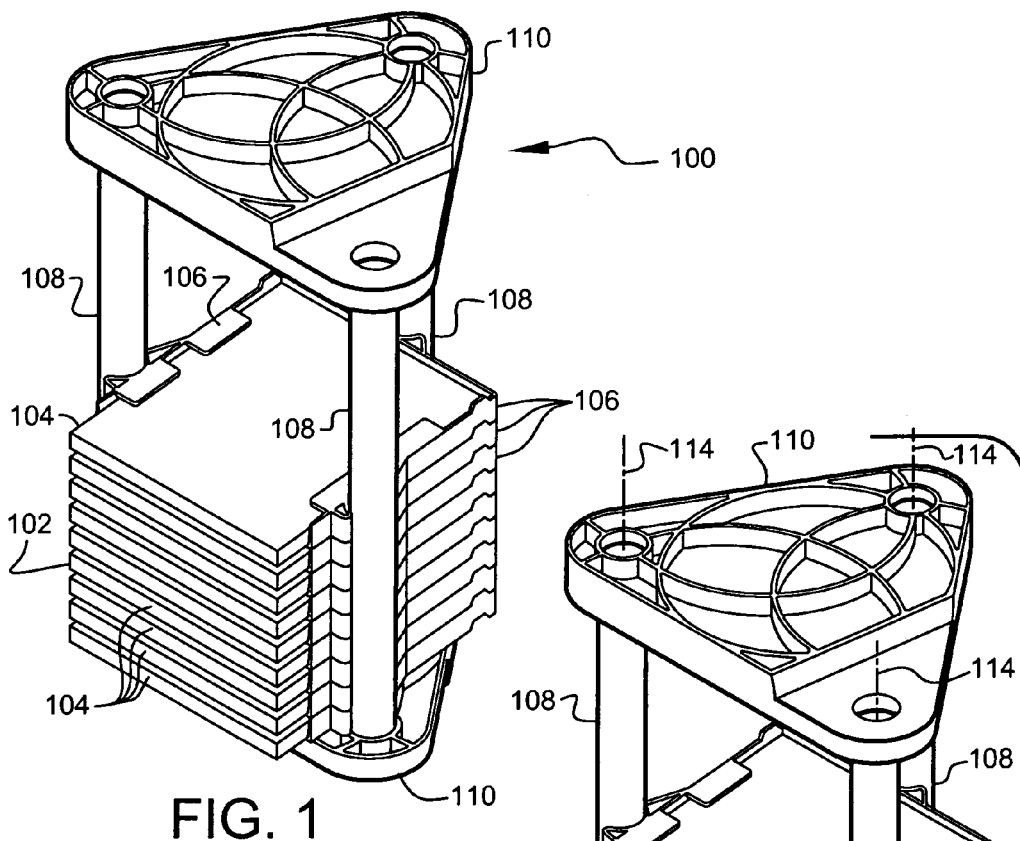
FIG. 1 shows a perspective view of a storage system according to a preferred embodiment of the present invention.

FIG. 1 is a perspective view of storage system 100 according to a preferred embodiment of the present invention. Preferably, storage system 100 provides an efficient means for user indexing and storage of data containing articles 102 such as, for example, Compact Disks (CDs), as shown. Upon reading the teachings of this specification, those with ordinary skill in the art will now understand that, under appropriate circumstances, considering such issues as advances in technology, user preference, etc., other data containing articles, such as Digital Versatile Disks (DVDs), tape storage cartridges, optical storage devices, mini-disks, analog storage systems, audio tapes, etc., may suffice.

In the embodiment of FIG. 1, storage system 100 is preferably adapted to store a plurality of Compact Disk jewelcases (hereinafter referred to as media element 104) in a vertical stack, as shown. In the example of FIG. 1, the vertical stack of media elements 104 comprises an indexed catalog of individual compact disks, as shown.

Preferably, each media element 104 is held in an individual holding caddy 106 (at least embodying herein at least one holder adapted to removably hold the at least one data-medium-containing article), as shown. Preferably, each holding caddy 106 is adapted to removably engage an arrangement of three, fixed, cylindrical positioning members 108 (at least herein embodying at least one such support adapted to support the at least one indexed arrangement of the plurality of the at least one data-medium-containing articles; and at least embodying herein at least three parallel bars), as shown. Preferably, cylindrical positioning members 108 are retained in an essentially fixed position by two base units 110 (at least embodying herein at least one geometry-fixer adapted to fix at least one geometry among such at least three parallel bars), as shown.

Figure 2:
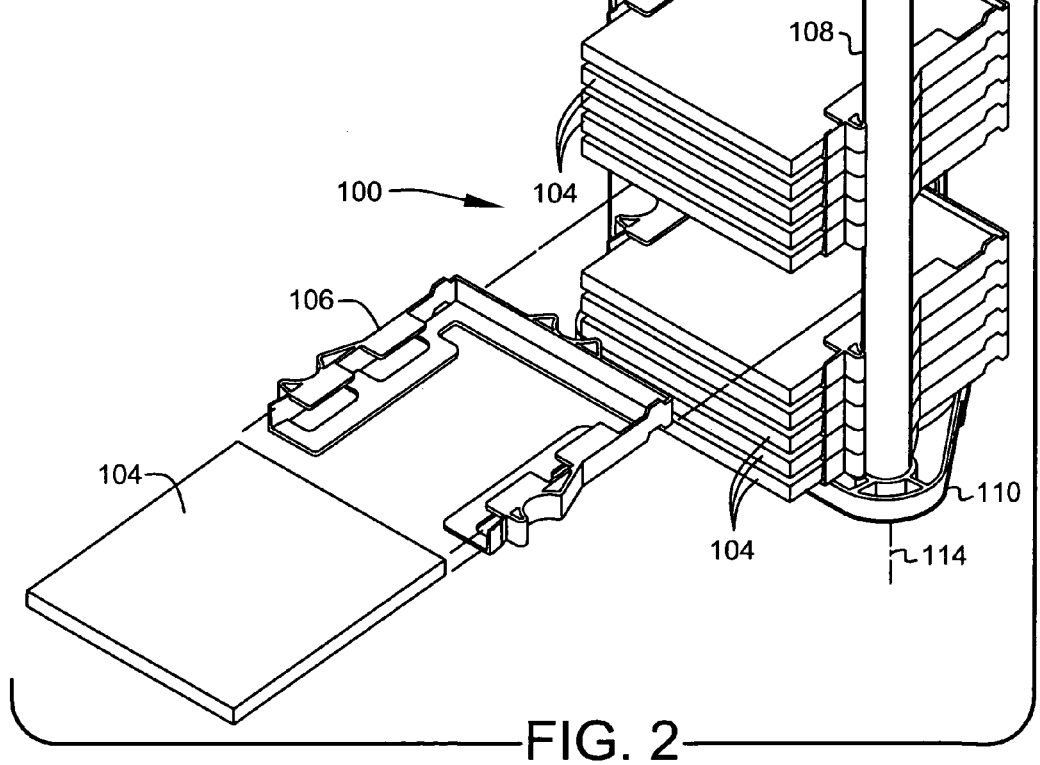
FIG. 2 shows a perspective view of the storage system with an additional holding caddy and disk case according to the preferred embodiment of FIG. 1.

FIG. 2 is a perspective view of storage system 100 receiving an additional holding caddy 106 and media element 104 according to the preferred embodiment of FIG. 1. When a user adds an additional media element 104 to the indexed catalog of stored media elements, the new media element 104 must be inserted into the stack at a proper position to maintain the pre-established index.

Preferably, storage system 100 permits quantity adjustments to the indexed arrangement of media elements without removing and reordering the previously stored media elements within the index arrangement. Preferably, each holding caddy 106, while engaged on cylindrical positioning members 108, is free to move up and down along a path essentially parallel with the longitudinal axes 114 of cylindrical positioning members 108, as shown. Furthermore, each holding caddy 106 is free to move independently with respect to any other holding caddy 106 within the stack, as shown. The above described enhanced functionality of storage system 100 permits an additional holding caddy 106 (and associated media element 104) to be inserted anywhere within the stack, without removing and reorganizing the existing media elements 104, as shown. Similarly, a holding caddy 106 (and media element 104) may be removed from the stack without disturbing the remaining arrangement of media elements 104 within the stack. This preferred feature provides a highly convenient, user responsive, means of storing an indexed catalog of articles where the quantity of articles changes over time.

Another preferred feature of storage system 100 is the efficiency with which the system provides a high degree of functionality while using relatively small amounts of material. Overall, system 100 requires a fraction of the material required to produce a conventional storage shelf or rack arrangement.

Figure 3:
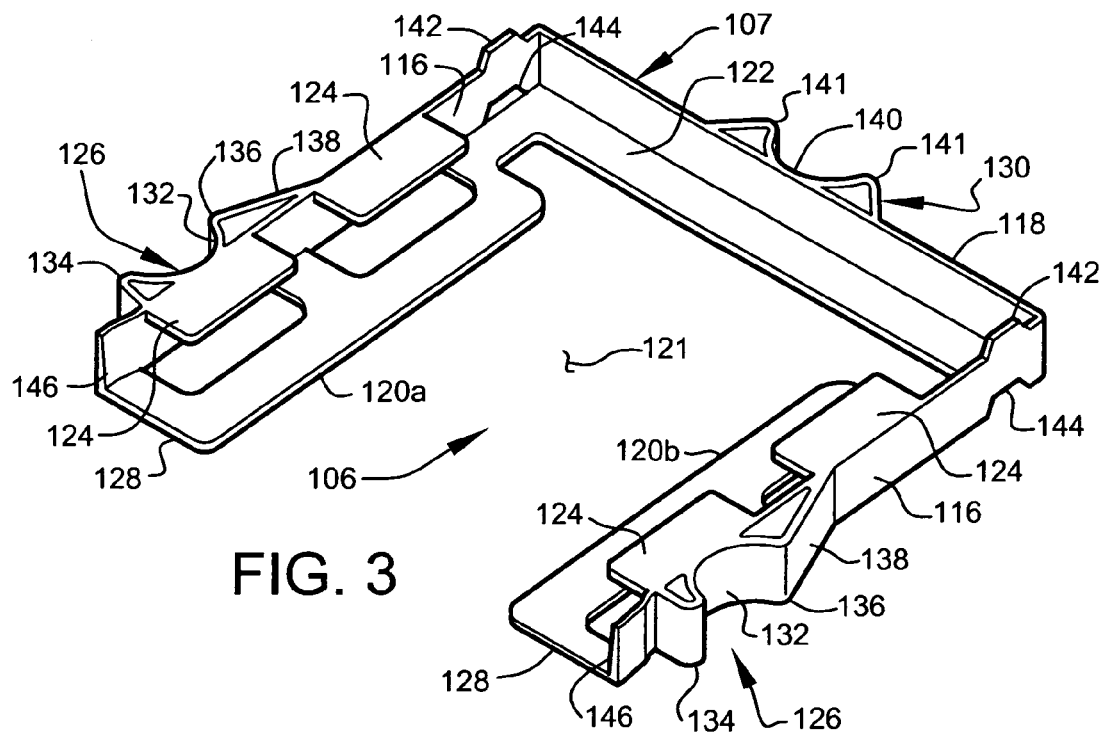
FIG. 3 shows a perspective view of a holding caddy according to the preferred embodiment of FIG. 1.

FIG. 3 is a perspective view of holding caddy 106 according to the preferred embodiment of FIG. 1. Preferably, holding caddy 106 comprises an essentially rectangular, three-sided frame 107 adapted to receive and removably hold media element 104 of FIG. 1 and FIG. 2. Upon reading the teachings of this specification, those with ordinary skill in the art will now understand that, under appropriate circumstances, considering such issues as advances in technology, user preference, storage media type, etc., other frame shapes, such as round, triangular, etc., may suffice.

Preferably, frame 107 comprises two opposing, symmetrically arranged sidewalls 116, as shown. Preferably, a transverse rear wall 118 extends between each sidewall 116, as shown. Each sidewall 116 preferably comprises a horizontally projecting support leg along its lower edge, as shown. Preferably, lower support leg 120a and lower support leg 120b function to support media element 104 within media holding area 121 (as shown in FIG. 1 and FIG. 2). Similarly, rear wall 118 preferably comprises a continuous horizontally projecting rear leg 122, as shown. Preferably, each sidewall 116 further comprises two horizontally projecting upper tabs 124 that function to retain media element 104 within media holding area 121 by preventing upward movement of a media element 104 relative to holding caddy 106. Upon reading the teachings of this specification, those with ordinary skill in the art will now understand that, under appropriate circumstances, considering such issues as advances in technology, user preference, the nature of the stored materials, ease of use, etc., other article-containment features, such as other tabs, solid top and/or bottom surfaces, a front door, etc., may suffice.

Preferably, frame 107 comprises lead angle 146 on the front edge of sidewall 116 to facilitate insertion of media elements 104 into holding caddy 106 (the above described structures of holding caddy 106 at least embody herein wherein such at least one holder comprises at least one support frame; such at least one support frame comprises at least one side wall and at least one rear wall; and such at least one side wall and such at least one rear wall, in combination, define at least one interior portion adapted to removably contain the at least one data-medium-containing article). Upon reading the teachings of this specification, those with ordinary skill in the art will now understand that, under appropriate circumstances, considering such issues as advances in technology, user preference, etc., other features adapted to assist insertion of media elements, such as horizontally projecting upper tabs, lead angles, lead chamfers, rollers, etc., may suffice.

Preferably, holding caddy 106 further comprises a specific arrangement of self-aligning engagement structures adapted to permit holding caddy 106 to removably engage cylindrical positioning members 108 of storage system 100 (as illustrated in FIG. 1 and FIG. 2). Preferably, each sidewall 116 comprises a single lateral engaging guide 126, located near the open end 128 of holding caddy 106, as shown. Preferably, each lateral engaging guide 126 (at least embodying herein at least one positioner adapted to position such at least one holder to at least one position within the at least one support supporting the at least one indexed arrangement of such plurality of such at least one data-medium-containing articles; and at least embodying herein at least one lateral engager located adjacent such at least one side wall) comprises a convex encircling radius 132 having an interior radius closely matching the outer radius of cylindrical positioning members 108, as shown. In the example embodiment of FIG. 3, convex encircling radius 132 preferably comprises an inner radius of about ¾ inches. Upon reading the teachings of this specification, those with ordinary skill in the art will now understand that, under appropriate circumstances, considering such issues as advances in technology, user preference, storage media type, storage system configuration, etc., other sizes of cylindrical positioning members and corresponding guides, such as large diameter members for a relatively tall storage system etc., may suffice.

Preferably, the distal ends of convex encircling radius 132 terminate at a front transitional radius 134 and a rear transitional radius 136, as shown. Preferably, rear transitional radius 136 smoothly adjoins a guide ramp 138 that, by means of its wedged shape, assists the user in guiding holding caddy 106 to a position of engagement with cylindrical positioning members 108 during holding caddy 106 insertion (as will be further described below).

Preferably, holder caddy 106 further comprises an arrangement of interlocking tabs 142 and interlocking pockets 144, as shown. Preferably, one interlocking tab 142 is projecting from the upper rear portion of each sidewall 116, as shown. Preferably, the lower portion of each sidewall 116 comprises an interlocking pocket 144 (complementary in size and shape to interlocking tab 142), as shown. Preferably, the arrangement of interlocking tabs 142 and interlocking pockets 144 function to interlock adjacent holding caddies 106, within a stack, to eliminate rotational binding during positioning of the caddies 106 within the stack. Additionally, the arrangement of interlocking tabs 142 and interlocking pockets 144 function to alert the user with a "snapped home" feeling as the caddy is fully inserted into storage system 100 (at least embodying herein wherein such at least one support frame comprises at least one alignment structure to align at least one first such at least one support frame with at least one second such at least one support frame).

Preferably, rear wall 118 comprises a single rear-engaging guide 130 located at the approximate midpoint of rear wall 118, between sidewalls 116, as shown. Preferably, rear-engaging guide 130 (at least embodying herein at least one positioner adapted to position such at least one holder to at least one position within the at least one support supporting the at least one indexed arrangement of such plurality of such at least one data-medium-containing articles; and further at least embodying herein at least one central engager located adjacent such at least one rear wall) comprises a convex encircling radius 140 having an interior radius also closely matching the outer radius of cylindrical positioning members 108. Preferably, each distal end of convex encircling radius 140 comprises a smooth transitional radius 141, as shown. In the example embodiment of FIG. 3, convex encircling radius 140 preferably comprises an inner diameter of about ¹³⁄₁₆" (20.64 mm). Preferably, each convex encircling radius 132 and convex encircling radius 140 are molded to be the full thickness of holding caddy 106 to further reduce rotational binding during insertion and removal.

It is preferred that holding caddy 106 be constructed from a single substantially rigid and moldable thermoplastic resin, preferably general-purpose polystyrene (such as, for example, "Styron 668" as manufactured by Dow Plastics, USA). Color may be added to holding caddy 106 by coating, mixing or blending the material forming holding caddy 106 with a pigment and/or dye, or by other well-known methods. Upon reading the teachings of this specification, those with ordinary skill in the art will now understand that, under appropriate circumstances, considering such issues as advances in technology, user preference, storage application, targeted consumer markets, etc., other materials, such as the use of multiple materials, mixtures of materials, aluminum, metallic alloys, carbon fiber, composites, etc., may suffice.

Figure 4:
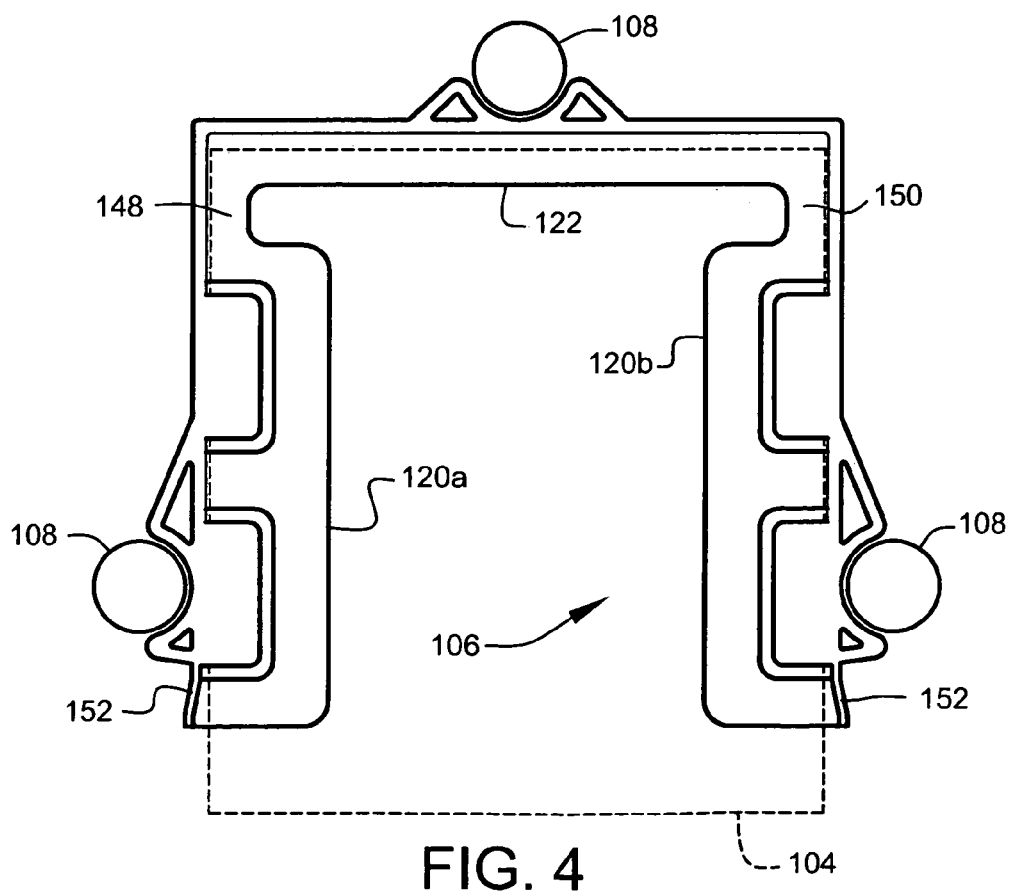
FIG. 4 shows a top view, partially in section, of the holding caddy fully engaged within cylindrical positioning members of the storage system according to the preferred embodiment of FIG. 1.

FIG. 4 is a top view, partially in section, of holding caddy 106 fully engaged within cylindrical positioning members 108 of storage system 100 according to the preferred embodiment of FIG. 1. FIG. 4 further illustrates the preferred relationship between holding caddy 106, lateral engaging guides 126, rear engaging guide 130, and cylindrical positioning members 108 during typical use. Each lateral engaging guide 126 and rear engaging guide 130 preferably engages one of the three cylindrical positioning members 108, as shown. Preferably, the arrangement of the three cylindrical positioning members 108 forms a triangle (at least embodying herein wherein intersections of such at least three parallel bars with at least one plane perpendicular to such at least three parallel bars form corners of at least one irregular polygon), as shown. The preferred three-point engagement of the example embodiment permits holding caddy 106 to be securely positioned within storage system 100, while providing a low friction non-binding means for vertical adjustment of holding caddy 106 by the user. Upon reading the teachings of this specification, those with ordinary skill in the art will now understand that, under appropriate circumstances, considering such issues as advances in technology, user preference, storage media design, specific system application, etc., other quantities of cylindrical positioning members, such as four or more positioning members, etc., may suffice.

Preferably, lower leg 120a and lower leg 120b each comprise a U-shaped cutout, which function as hinges by providing narrowed, areas of flexure within frame 107. Preferably, first hinge 148 is located adjacent to the transition between lower support 120a and rear support leg 122, as shown. Similarly, second hinge 150 is located adjacent to the transition between lower support 120b and rear support leg 122, as shown. Preferably, both first hinge 148 and second hinge 150 (at least embodying herein at least one hinge adapted to permit at least one user adjustment to at least one outer dimension of such at least one support frame) function to facilitate user manipulation of holding caddy 106 as further described below. Upon reading the teachings of this specification, those with ordinary skill in the art will now understand that, under appropriate circumstances, considering such issues as advances in technology, user preference, material selection, intended use, etc., other, methods of resiliently hinging the caddy, such as spring-loaded knuckle-type hinges, alternate living hinges, pivots, piano-type hinges, slip joints, etc., may suffice.

Preferably, holding caddy 106 is designed to position media element 104 such that the projecting end of the media element case overhangs the system by an amount enabling the user to easily manipulate media element 104 (including those media elements immediately adjacent to base units 110), as shown.

Figure 5:
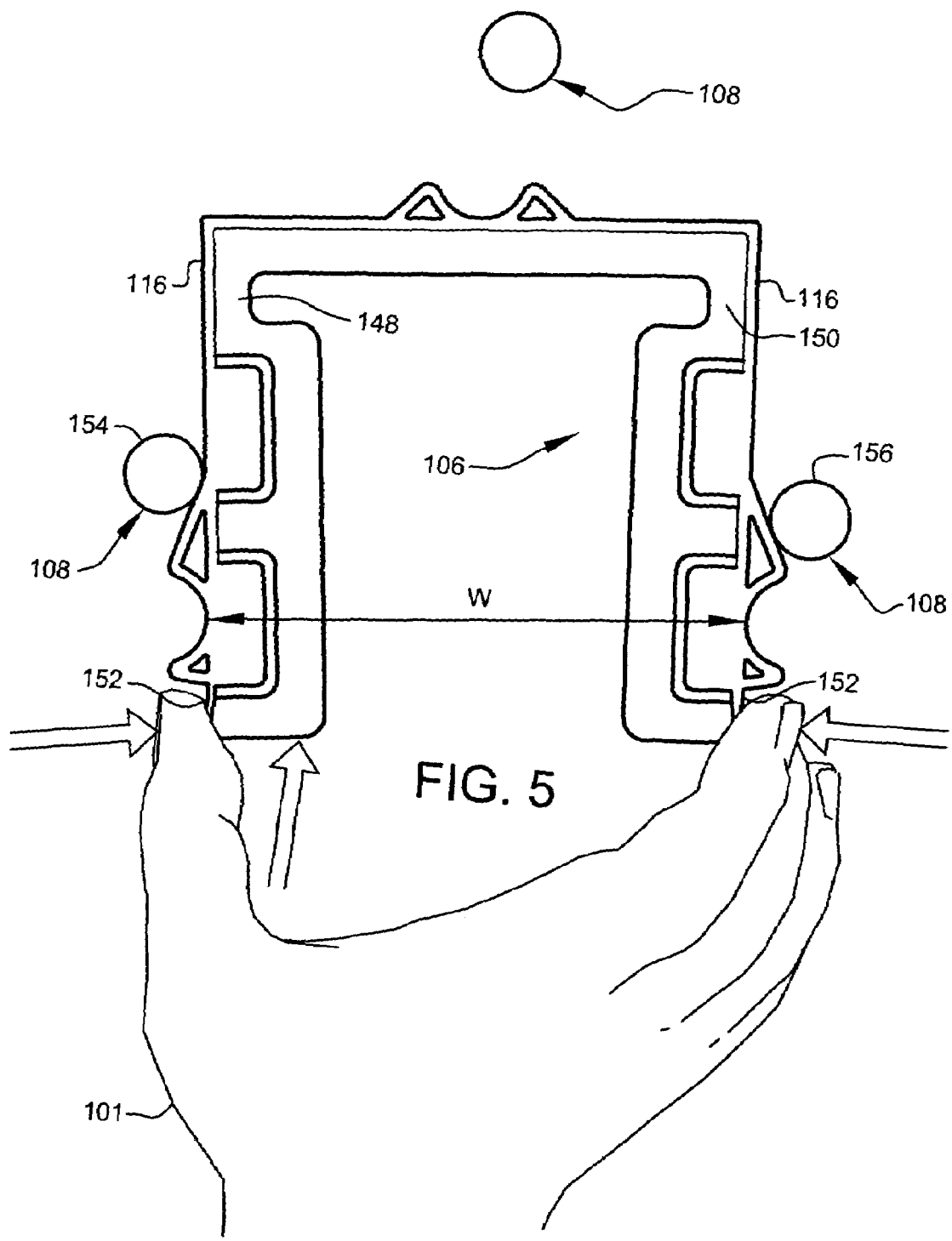
FIG. 5 shows a top view, partially in section, of the holding caddy partially engaged within the cylindrical positioning members of the storage system, according to the preferred embodiment of FIG. 1.

FIG. 5 is a top view, partially in section, of holding caddy 106, partially engaged within cylindrical positioning members 108 of storage system 100, according to the preferred embodiment of FIG. 1. Proper insertion of holding caddy 106 into storage system 100 requires minimal effort by the user 101. Preferably, using the illustrated finger grip, user 101 grasps caddy 106 by applying an opposing "pinching" pressure to the outer faces 152 of sidewalls 116, as shown. As user 101 applies additional compressive pressure to caddy 106, deflection of the resilient material within first hinge 148 and second hinge 150 permits frame 107 to flex inwardly, temporarily reducing the width W of holding caddy 106, as shown.

Eventually, frame 107 reaches a compressed width that permits holding caddy 106 to pass between side cylindrical positioning member 154 and side cylindrical positioning member 156, as shown. Preferably, as holding caddy reaches an appropriate operational position between lateral engaging guides 126 and cylindrical positioning members 108 (see FIG. 4), the user releases pressure on frame 107 permitting lateral engaging guides 126 to spring apart to appropriately engage cylindrical positioning members 108. Preferably, storage media element 104 placed within holding caddy 106 locks holding caddy 106 within cylindrical positioning members 108 by preventing frame 107 from flexing inwardly.

Guide ramps 138 of lateral engaging guides 126 provide two preferred functions. In the first preferred function, guide ramps 138 assist user 101 in flexing frame 107 inwardly during insertion of holder caddy 106, as shown. As holding caddy 106 is directed toward rear cylindrical positioning member 158, guide ramps 138 preferably press against cylindrical positioning members 108 to compress frame 107, as shown. Preferably, guide ramps 138 are arranged such that a single point of force applied to the front portion of frame 107 is sufficient to fully engage holding caddy 106 in storage system 100 (at least embodying herein wherein such at least one self-guiding structure permits such at least one holder to be self guided to such at least one position within the at least one support by application of a single line of force at a single point on such at least one holder). Secondly, guide ramps 138 (at least embodying herein wherein such at least one self-guiding structure comprises at least one ramp-shaped portion) are preferably arranged to positively align rear-engaging guide 130 with rear cylindrical positioning member 158, as will be further described in FIG. 6.

Figure 6:
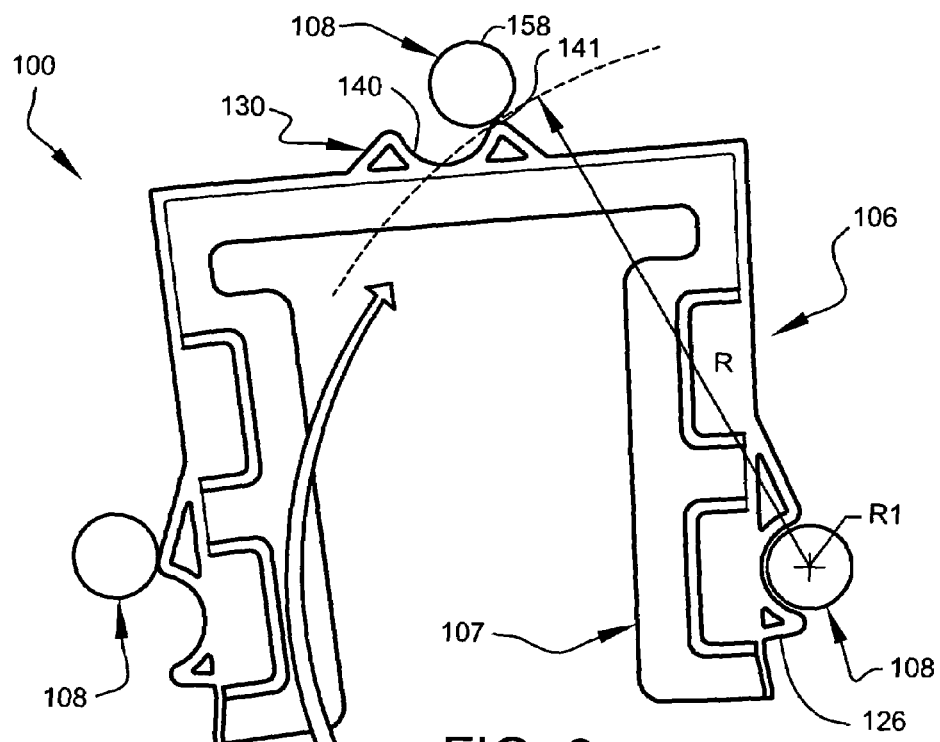
FIG. 6 shows another top view, partially in section, of the holding caddy partially engaged within the cylindrical positioning members of the storage system, according to the preferred embodiment of FIG. 1.

FIG. 6 is another top view, partially in section, of holding caddy 106, partially engaged within cylindrical positioning members 108 of storage system 100. In the example of FIG. 6, holding caddy 106 has been inserted at an extremely misaligned angle to illustrate the capacity of storage system 100 to self-correct holding caddy alignments during an insertion.

Despite having initially engaged only one lateral engaging guide 126 on a single cylindrical positioning member 108, as shown, the self correcting features of holding caddy 106 prevents binding, as shown. Preferably, storage system 100 is adapted to self-direct holding caddy 106 into proper engagement with all cylindrical positioning members 108, by means of small, additional, applications of force by the user. This feature is preferably accomplished by designing frame 107 to comprise a radius of rotation R, about radius point R1, that permits transitional radius 141 (most proximal to radius point R1) to clear rear cylindrical positioning member 158 during user caddy insertion operations, as shown. Radius R1 is preferably located at the center of the lateral cylindrical positioning member 108, as shown. Further, the arc length of encircling radius 140 is preferably limited, to permit the above-described clearance maneuver to be accomplished. Preferably, holding caddy 106 can be both removed and inserted by applying a single, direct, forward or reverse force as a result of preferred shape arrangements of lateral engaging guides 126, and rear engaging guide 130 (at least embodying herein at least one self-guider adapted to permit self-guiding of such at least one holder to such to at least one position within the at least one support; and further embodying herein, at least, wherein such at least one self-guider comprises at least one self-guiding structure adapted to provide at least one geometrical relationship with the support permitting such self-guiding), as shown.

Figure 7:
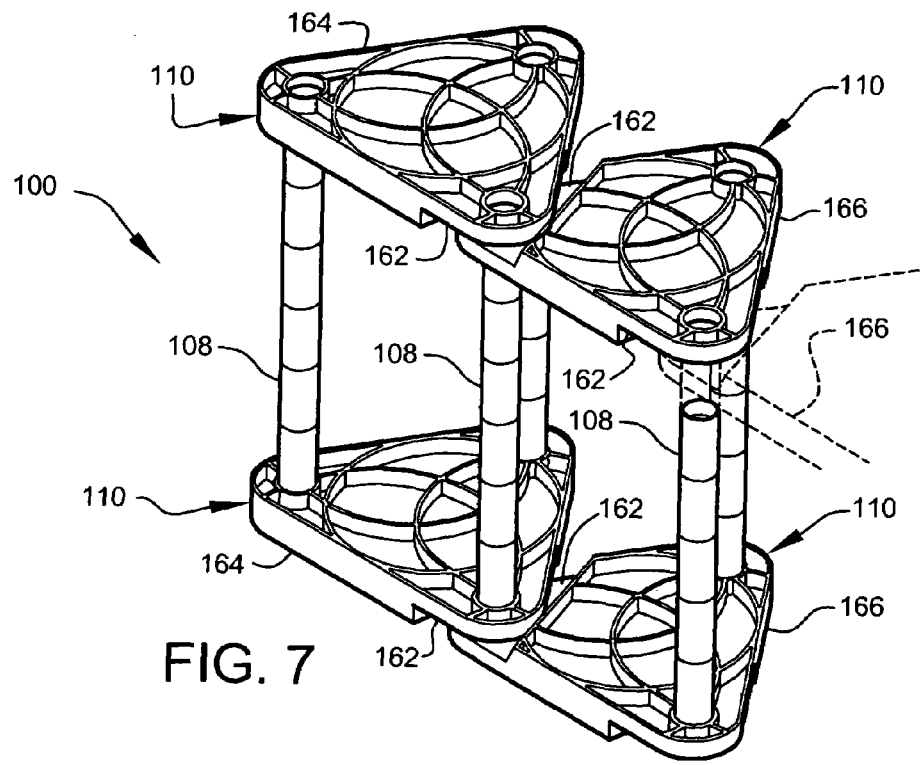
FIG. 7 shows a perspective view, partially in section, illustrating a multi-stack configuration of the storage system according to a preferred embodiment of the present invention.

FIG. 7 is a perspective view, partially in section, illustrating a multi-stack configuration of storage system 100 according to a preferred embodiment of the present invention. Preferably, base units 110 are adapted to permit two or more bases to be joined in series, as shown. This inherent modularity permits storage system 100 to be dynamically modified to fully accommodate the storage requirements of the user. In FIG. 7, the storage capacity of storage system 100 has been expanded by adding additional adjacent base units 110 and additional cylindrical positioning members 108, as shown.

FIG. 8 is an exploded perspective view further illustrating the storage system components of a multi-stack configuration according to the preferred embodiment of FIG. 7. Preferably, base units 110 have two physical variations comprising end base units 164 and intermediate base units 166, as shown. Preferably, end base units 164 are used in single stack applications (as in FIG. 1) and at the end positions of multi-stack configurations, as shown. Intermediate base units 166 are preferably used at all middle stacks within a multi-stack arrangement, as shown. Preferably, all bases comprise at least one half-lap notch 162 to permit the interlocking of multiple bases (as shown in FIG. 7). Preferably, end base units 164 comprise a single half-lap notch 162, as shown. Intermediate base units 166 preferably comprise two half-lap notches 162, as shown. Preferably, base units 110 comprise rotational symmetry and therefore may be used on both the top and bottom of the system assembly, as shown.

A typical multi-stack configuration of system 100 is preferably assembled by joining an upper and lower end base unit 164 with a side cylindrical positioning member 108, and a rear cylindrical positioning member 158, as shown. Preferably, upper and lower intermediate base units 166 are aligned such that half-lap notches 162 of intermediate base units 166 may engage half-lap notches 162 of the adjacent end base units 164, as shown. Preferably, a common cylindrical positioning member 108a is used to connect adjacent base units 110, as shown. Preferably, the end portion 108b of common cylindrical positioning member 108a extends through a first base unit (end base unit 164 in FIG. 8) to engage a second base unit [intermediate base units 166 in FIG. 8] in the joined configurations, as shown. The preferred use of common cylindrical positioning members 108a greatly increases the storage density of storage system 100, as shown.

Additional intermediate stacks may be added to a multi-stack system by adding additional upper and lower intermediate base units 166 and cylindrical positioning members 108 to the system, as shown. Preferably, multi-stack configurations of storage system 100 begin and end with a set of upper and lower end base units 164, as shown.

FIG. 9 is a side view generally illustrating the physical configuration of a typical end base unit 164 according to the preferred embodiments of the present invention. The preferred single half-lap notch 162 of end base unit 164 is clearly visible in FIG. 9. Preferably, half-lap notch 162 is one-half the thickness of base unit 110, as shown.

FIG. 10 is a side view generally illustrating the physical configuration of a typical intermediate base unit 166 according to the preferred embodiments of the present invention. The preferred double half-lap notch 162 of intermediate base unit 164 is clearly visible in FIG. 10. Preferably, both half-lap notches 162 are one-half the thickness of base unit 110, as shown. Preferably, intermediate base unit 164 is adapted to interlock with either end base units 164 or other intermediate base units 166, as shown. Upon reading the teachings of this specification, those with ordinary skill in the art will now understand that, under appropriate circumstances, considering such issues as advances in technology, user preference, etc., other arrangements, such as non-interconnecting bases, single bases having multiple sets of positioning members, etc., may suffice.

It is preferred that base units 110 be constructed from a substantially rigid and moldable thermoplastic resin. Preferably, base units 110 comprise a general-purpose polystyrene (such as, for example, "Styron 668" as manufactured by Dow Plastics, USA). Most preferably, base units 110 are constructed from acrylonitrile-butadiene-styrene (ABS) plastic such as, for example, the Magnum series of ABS resins manufactured by Dow Plastics, USA. Color may be added to base units 110 by coating, mixing or blending the material forming base units 110 with a pigment and/or dye, or by other well-known methods. Upon reading the teachings of this specification, those with ordinary skill in the art will now understand that, under appropriate circumstances, considering such issues as advances in technology, user preference, cost, service life, storage application, target consumer markets, etc., other materials, such as multiple materials, mixtures of materials, other thermally set resins, aluminum or other metals and alloys, wood, etc., may suffice.

FIG. 11 is a top view generally illustrating the physical configuration of a typical end base unit 164 according to the preferred embodiments of the present invention. Preferably, end base unit 164 comprises an essentially triangular form, as shown. Each corner of end base unit 164 preferably comprises one receiving socket 168, as shown. Preferably, each receiving socket 168 is adapted to receive and removably retain one end of a cylindrical positioning member 108, as shown. Preferably, receiving socket 168 comprises a counterbored aperture having an inner diameter sized to firmly retain cylindrical positioning members 108 in place, as shown. End base unit 164 further comprises an arrangement of reinforcing flanges 170, as shown. Preferably, reinforcing flanges 170 add structural rigidity to end base unit 164 without adding the material or weight that would be associated with an equivalent solid casting. Solid web panels 172 preferably infill the areas between reinforcing flanges 170 to further increase the structural rigidity of the base fixture, as shown. The preferred single half-lap notch 162 (indicated by the dashed line) is located on the opposite side of end base unit 164, as shown.

FIG. 12 is a top view, generally illustrating the physical configuration of a typical intermediate base unit 166, according to the preferred embodiments of the present invention. Preferably, intermediate base unit 166 is constructed in a manner generally similar to end base unit 164 described above. Preferably, intermediate base unit 166 comprises two half-lap notches 162, as shown. Preferably, one half-lap notch 162 located on the visible upper surface of the intermediate base unit 166 of FIG. 12, and one half-lap notch 162 (indicated by the dashed line) located on the opposite side, as shown.

FIG. 13 is a side view illustrating a typical multi-stack configuration of storage system 100 according to a preferred embodiment of the present invention. The preferred modularity features of storage system 100 permits storage system 100 to be dynamically modified in both width and height, as shown. Preferably, both end base units 164 and intermediate base units 166 comprise receiving sockets 168 that permit additional cylindrical positioning members 108 to be inserted above (or below) the base fixtures, as shown. This preferably permits storage system 100 to expand vertically as well as horizontally, as shown. Additional base units 110 may be placed at appropriate vertical intervals to provide additional stability to the system, as shown. The preferred modular features of the invention permit storage system 100 to be assembled in a wide range of configurations. For example, storage system 100 may be assembled as a small desktop system or, may be expanded to a larger floor standing wall unit.

Figure 14:
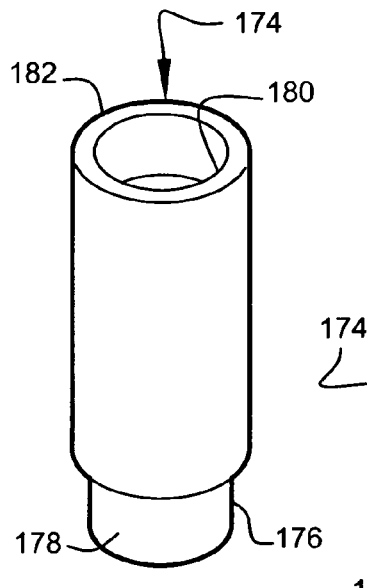
FIG. 14 shows a perspective view of a cylindrical positioning member comprising a post and socket assembly according to a preferred embodiment of the present invention.
Figure 15:
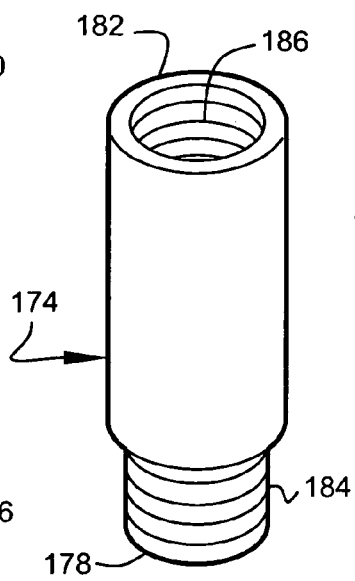
FIG. 15 shows a perspective view of a cylindrical positioning member comprising a screw and socket assembly according to a preferred embodiment of the present invention.
Figure 16:
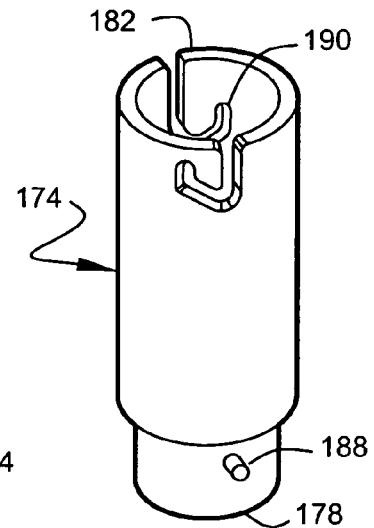
FIG. 16 shows a perspective view of a cylindrical positioning member comprising a bayonet-type assembly according to a preferred embodiment of the present invention.

FIG. 14 is a perspective view of cylindrical positioning member 108 comprising a dowel and socket assembly according to a preferred embodiment of the present invention. FIG. 15 is a perspective view of cylindrical positioning member 108 comprising a screw and socket assembly according to a preferred embodiment of the present invention. FIG. 16 is a perspective view of cylindrical positioning member 108 comprising a bayonet type assembly according to a preferred embodiment of the present invention.

An additional preferred feature of storage system 100 is the flexible modularity of cylindrical positioning members 108. Preferably, cylindrical positioning members 108 comprise a series of individual cylindrical segments 174 that are user assembled to provide cylindrical positioning members 108 of any preferred length (at least embodying herein at least one length adjuster adapted to adjust such at least one length of such at least one substantially cylindrical member; and at least embodying herein at least one interengaging segment), as shown. In the preferred embodiment of FIG. 14, cylindrical segment 174 comprises smooth post 176 at first end 178, and smooth socket 180 at second end 182, as shown. Preferably, smooth post 176 is adapted to removably friction fit within smooth socket 180, as shown.

In the alternate preferred embodiment of FIG. 15, cylindrical segment 174 comprises threaded post 184 at first end 178, and threaded socket 186 at second end 182, as shown. Preferably, threaded post 184 is adapted to removably thread to threaded socket 186, as shown.

FIG. 16 illustrates another alternate preferred embodiment of cylindrical segments 174. In FIG. 16, cylindrical segment 174 comprises bayonet post 188 at first end 178, and bayonet socket 190 at second end 182, as shown. Preferably, bayonet post 188 is adapted to removably engage bayonet socket 190, in a well-known manner. While the friction fit connection of FIG. 14 provides low cost and ease of assembly, both the threaded and bayonet connections of FIG. 15 and FIG. 16 provide additional structural strength to storage system 100 by mechanically interlocking individual cylindrical segments 174. All cylindrical segments 174 are adapted to engage receiving sockets 168 of base units 110, as shown. Preferably, the length of individual cylindrical segments 174 are established to correspond to the heights of several stacked holding caddies 106. Upon reading the teachings of this specification, those with ordinary skill in the art will now understand that, under appropriate circumstances, considering such issues as advances in technology, user preference, system configuration and size, etc., other methods of joining the cylindrical segments, such as twist-lock devices, snap-together posts and sockets, spring loaded ball and sockets, magnetic couplers, etc., may suffice.

Upon reading the teachings of this specification, those with ordinary skill in the art will now understand that, under appropriate circumstances, considering such issues as advances in technology, user preference, alternate system configurations and arrangements, etc., other cylindrical member end configurations, such as double ended units, units accommodating mechanical fasteners, etc., may suffice.

Preferably, cylindrical segments 174 comprise a molded plastic such as, for example, ABS. Color may be added to cylindrical segments 174 by coating, mixing or blending the material forming cylindrical segments 174 with a pigment and/or dye, or by other well-known methods.

Upon reading the teachings of this specification, those with ordinary skill in the art will now understand that, under appropriate circumstances, considering such issues as advances in technology, user preference, cost, service life, storage application, target consumer markets, etc., other materials, such as multiple materials, mixtures of materials, other thermally set resins, aluminum or other metals and alloys, wood, etc., may suffice.

Figure 17:
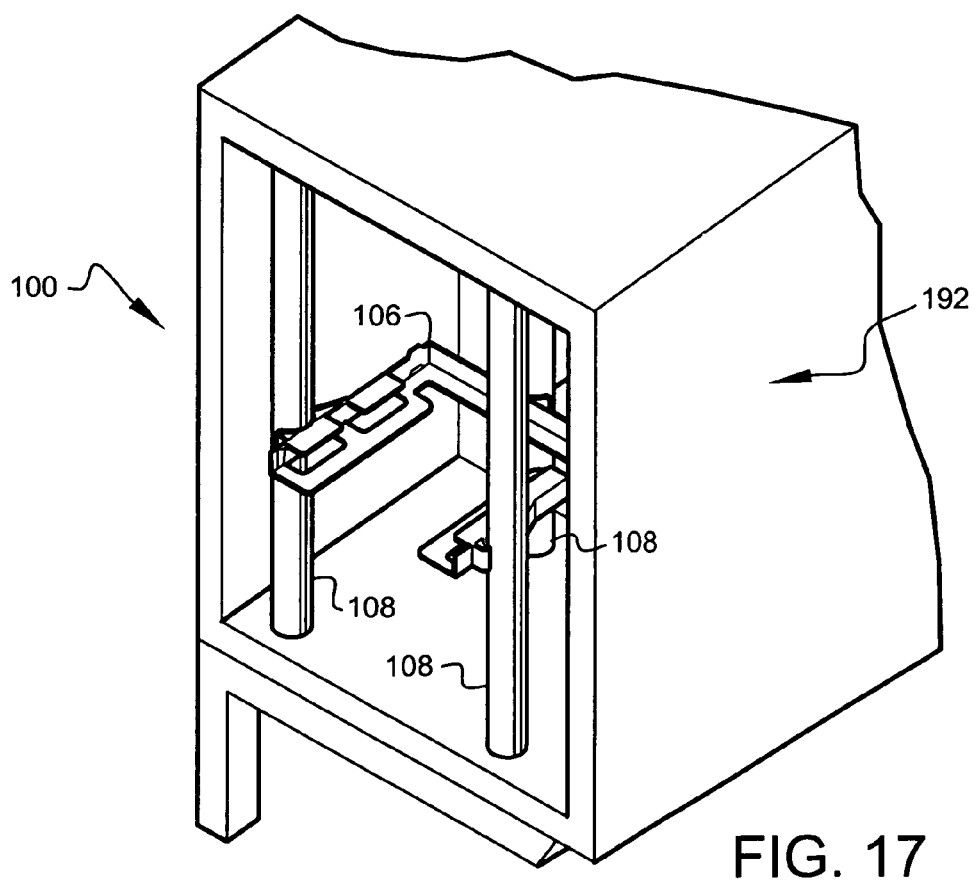
FIG. 17 shows a perspective view of the storage system incorporated within a furnishing according to a preferred embodiment of the present invention.

FIG. 17 is a perspective view of storage system 100 incorporated within a furnishing component according to a preferred embodiment of the present invention. Preferably, storage system 100 is adaptable to furniture such as cabinets or, as illustrated in FIG. 17, an entertainment center 192, as shown. A furniture manufacturer may preferably include within the construction of the furniture, an array of cylindrical positioning members 108 (at least embodying herein wherein at least one geometry-fixer comprises at least one portion of at least one furnishing), adapted to receive holding caddies 106, as shown. In preferred embodiments wherein storage system 100 comprises a furniture piece, cylindrical positioning members 108 may preferably comprise a wood dowel. It should be noted that the scope of the present invention preferably includes other embodiments adapted to furniture articles. Further, the term "furniture" preferably includes a diverse range of movable and fixed structures, not limited to, cabinets, closets, walls, shelving units, fabric housings, seating units and the like.

Storage system 100 preferably operates effectively in both a vertical and horizontal configuration. Additionally, storage system 100 is preferably adapted to operate in a reclined position as needed, for example, to fit within a cabinet drawer. Preferably, storage system 100 can be completely reconfigured or expanded if either its volume or environment changes.

Figure 18:
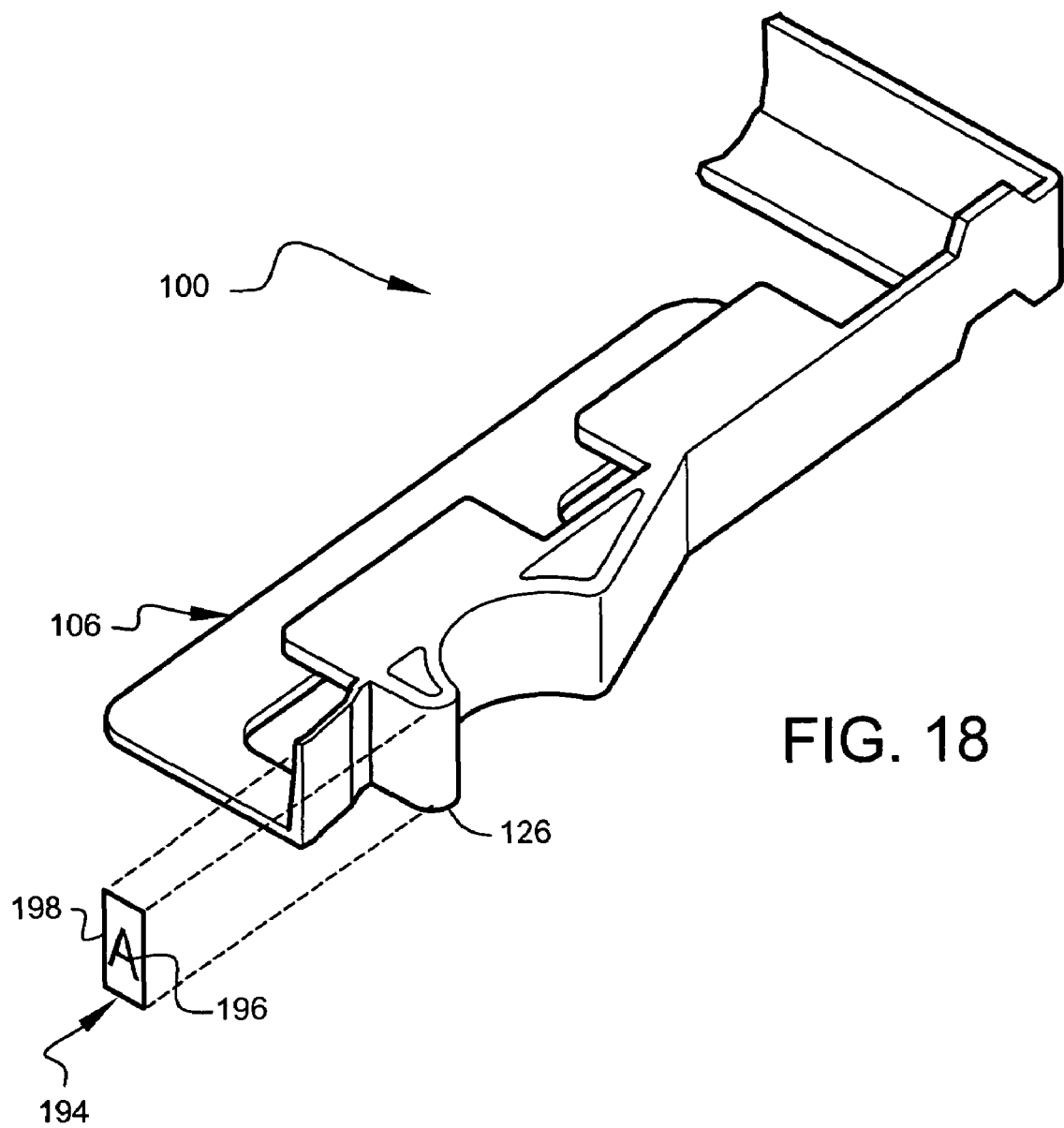
FIG. 18 shows a partial perspective view illustrating an indexing label applied to the holding caddy, according to a preferred embodiment of the present invention.

FIG. 18 is a partial perspective view illustrating indexing label 194 applied to holding caddy 106, according to a preferred embodiment of the present invention. To facilitate user indexing of data containing articles 102 (as illustrated in FIG. 1), holding caddy 106 may preferably include indicium 196 (at least embodying herein wherein such at least one holder comprises indicia to assist the user in organizing the at least one indexed arrangement), as shown. Preferably, indicium 196 is applied to a portion of holding caddy 106 visible on insertion of the caddy into the system, as shown. Preferably, indicium 196 is located on a portion of lateral engaging guide 126, as shown. Preferably, indicium 196 comprises printed label 198, preferably adhesive applied to holding caddy 106, as shown. Upon reading the teachings of this specification, those with ordinary skill in the art will now understand that, under appropriate circumstances, considering such issues as advances in technology, user preference, system cost, preferred application, etc., other methods of identifying caddies within the user established index, such as direct silk-screening, color coding the caddy, using bar-codes, using computer-readable indicia or labels, etc., may suffice.

Referring again to FIG. 7, the preferred features of storage system 100 permits a user to assemble units in non-linear arrangements. For example, end base units 164 and intermediate base units 166 of storage system 100 are adapted to permit, when combined, the assembling of gradually curving modular arrangements, as shown.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A data medium storage system, relating to storing at least one data-medium-containing article within at least one support supporting at least one indexed arrangement of a plurality of such at least one data-medium-containing articles, said storage system comprising:
   a) at least one holder adapted to removably hold the at least one data-medium-containing article;
   b) at least one holder-support assembly to support the at least one indexed arrangement of the plurality of the at least one data-medium-containing articles;
   c) said at least one holder-support assembly comprising
      i) at least three bars each comprising at least one substantially cylindrical member having at least one length,
      ii) at least two geometry-fixers to fix geometric arrangement of said at least three bars,
      iii) wherein said at least two geometry-fixers supports said at least three bars in parallel orientation,
      iv) wherein said geometric arrangement of said at least three bars is an irregular polygon,
      v) wherein at least one bar of said at least three bars is positioned rearward,
      vi) wherein at least two bars of said at least three bars are positioned laterally of said at least one rearward-positioned bar, and
      vii) wherein said at least one of said at least two geometry-fixers engages said at least three bars at an end position, and another of said at least two geometry-fixers engages at least two of said at least three bars at an opposing end or intermediate position; and
   d) wherein said at least one holder comprises
      i) at least one support frame, said at least one support frame comprising at least one side wall and at least one rear wall, and wherein said at least one side wall and said at least one rear wall, in combination, define at least one interior portion adapted to removably contain the at least one data-medium-containing article;
      ii) at least one positioner adapted to position said at least one holder to at least one position within said at least one holder-support assembly supporting the at least one indexed arrangement of such plurality of such at least one data-medium-containing articles;
      iii) wherein said at least one positioner comprises at least one rearward-bar engaging surface and at least two lateral-bar engaging surfaces;
      iv) at least one self-guider adapted to permit self-guiding of said at least one holder to such to at least one position within said at least one holder-support assembly;
      v) wherein said at least one self-guider comprises at least one self-guiding structure adapted to provide at least one geometrical relationship with the holder-support assembly permitting such self-guiding; and
      vi) wherein said at least one self-guiding structure comprises at least one ramp structure to facilitate user insertion of said at least one holder to such at least one position within said at least one holder-support assembly.

2. The storage system according to claim 1 wherein said at least one positioner comprises:
   a) at least one lateral engager located adjacent said at least one side wall; and
   b) at least one central engager located adjacent said at least one rear wall.

3. The storage system according to claim 1 wherein said at least one support frame further comprises at least one hinge adapted to permit at least one user adjustment to at least one outer dimension of said at least one support frame.

4. The storage system according to claim 3 wherein said at least one hinge is integrally formed within said at least one support frame.

5. The storage system according to claim 4 wherein said at least one holder comprises indicia to assist the user in organizing the at least one indexed arrangement.

6. The storage system according to claim 5 wherein said indicia comprises at least one adhesive label.

7. The storage system according to claim 6 wherein said at least one holder comprises at least one thermoset resin.

8. The storage system according to claim 1
   e) wherein said at least one substantially cylindrical member comprises at least one length adjuster adapted to adjust said at least one length of said at least one substantially cylindrical member between said at least two geometry-fixers.

9. The storage system according to claim 8 wherein said at least one length adjuster comprises at least one interengaging segment.

10. The storage system according to claim 9 wherein said at least one substantially cylindrical member comprises at least one plurality of interengaging segments comprising said at least one interengaging segment.

11. The storage system according to claim 10 wherein said at least one interengaging segment comprises at least one interlocker adapted to interlock at least one first said at least one interengaging segment to at least one second said at least one interengaging segment.

12. The storage system according to claim 11 wherein said at least one interlocker comprises at least one threaded post and at least one complementary receiving socket.

13. The storage system according to claim 11 wherein said at least one interlocker comprises at least one bayonet post and at least one complementary receiving socket.

14. The storage system according to claim 11 wherein said at least one interlocker comprises at least one friction-fit post and at least one complementary receiving socket.

15. The storage system according to claim 1 wherein said at least one self-guiding structure permits said at least one holder to be self guided to such at least one position within the at least one support by application of a single line of force at a single point on said at least one holder.

* * * * *